United States Patent [19]

Ide et al.

[11] Patent Number: 6,087,408
[45] Date of Patent: Jul. 11, 2000

[54] PROCESS FOR THE PRODUCTION OF POLYOLEFIN RESIN FOAMS

[75] Inventors: Satoshi Ide; Takashi Shibanuma, both of Settsu, Japan

[73] Assignee: Daikin Industries, Ltd., Osaka, Japan

[21] Appl. No.: 09/367,280

[22] PCT Filed: Jan. 19, 1998

[86] PCT No.: PCT/JP98/00189

§ 371 Date: Aug. 16, 1999

§ 102(e) Date: Aug. 16, 1999

[87] PCT Pub. No.: WO98/36020

PCT Pub. Date: Aug. 20, 1998

[30] Foreign Application Priority Data

Feb. 17, 1997 [JP] Japan .................................. 9-031842

[51] Int. Cl.$^7$ ...................................... C08J 9/00
[52] U.S. Cl. ............................ 521/79; 521/131; 521/142; 521/143; 521/146; 521/147; 521/148; 521/98
[58] Field of Search ..................................... 521/142, 146, 521/147, 148, 98, 131, 143, 79

[56] References Cited

U.S. PATENT DOCUMENTS

| | | | |
|---|---|---|---|
| 5,523,333 | 6/1996 | Fishback et al. | 521/131 |
| 5,672,294 | 9/1997 | Lund et al. | 521/131 |
| 5,817,705 | 10/1998 | Wilkes et al. | 521/79 |
| 5,866,029 | 2/1999 | Lund et al. | 521/131 |
| 5,993,707 | 11/1999 | Chaudhary et al. | 521/79 |

*Primary Examiner*—Morton Foelak
*Attorney, Agent, or Firm*—Larson & Taylor PLC

[57] ABSTRACT

This invention provides a process for preparing a polyolefin resin foam, comprising the step of extruding to a low-pressure zone a melt of polyolefin resin containing a volatile blowing agent uniformly dispersed therein, the process being characterized in that the volatile blowing agent is a mixture of 5 to 95% by weight of 1,1,1,3,3-pentafluoropropane and 95 to 5% by weight of a low-boiling aliphatic hydrocarbon having a boiling point of 15° C. or lower. According to the invention, there is obtainable a foam of polyolefin resin which is excellent in heat insulating property, dimensional stability and the like and which can retain them for a long term, using a blowing agent which is free of ozone-depleting risks, unlikely to adversely affect global warming, nonflammable and highly compatible with raw materials for foams.

3 Claims, 1 Drawing Sheet

F I G. 1
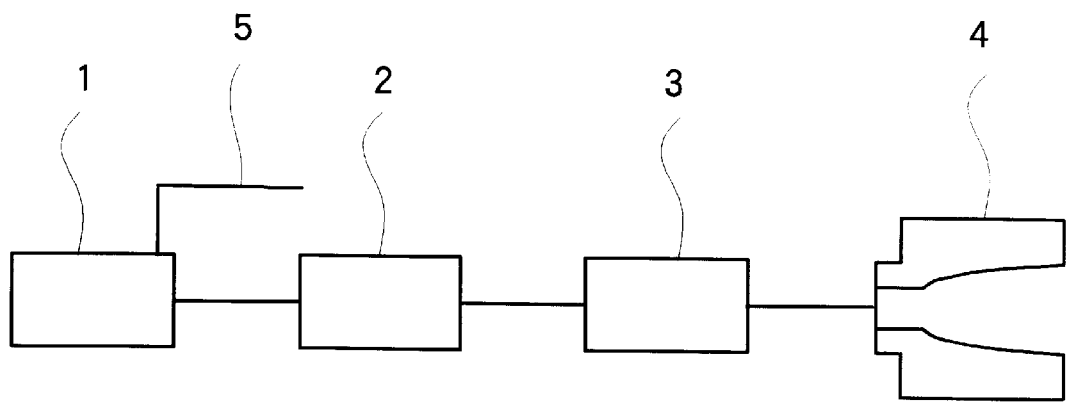

PROCESS FOR THE PRODUCTION OF POLYOLEFIN RESIN FOAMS

FIELD OF THE INVENTION

The present invention relates to a process for preparing a polyolefin resin foam and more particularly to a process for preparing an extruded foam of polyolefin resin which can retain its excellent heat insulating property for a long term, the process being characterized by use of a specific volatile blowing agent.

BACKGROUND ART

Widely practiced were processes for preparing a polyolefin resin foam wherein a volatile blowing agent is added to a melt of polyolefin resin such as styrene resin and the mixture is extruded to a low-pressure zone.

In such processes, dichlorodifluoromethane (CFC-12), dichlorotetrafluoroethane (CFC-114) and the like have been heretofore mainly used as the volatile blowing agent.

However, in recent years, it was suggested that certain kinds of flons, when released into the atmosphere, would deplete the stratospheric ozone layer and would cause global warming due to greenhouse effect, thereby inflicting a serious adverse influence on the ecosystem including humans. In this situation, an international agreement calls for a restriction of use of flons with a high ozone-depleting risk. Said CFC-12 and CFC-114 are among the flons to be controlled for restriction. From this viewpoint as well, there is a need for development of novel blowing agents which are free or substantially free from the ozone-depleting and global warming problems.

Of late, chlorodifluoromethane and 1-chloro-1,1-difluoroethane were proposed as flons which would exert little influence on the ozone layer, and they are now coming into use. Yet they contain chlorine in the molecule and are still threatening us with ozone depletion.

Further, the use of chlorine-free fluorohydrocarbon free from ozone-depleting risks was suggested in Japanese Unexamined Patent Publication No.239251/1993 which proposed the use of 1,1,1,3,3-pentafluoropropane as a blowing agent for the production of urethane foams.

Since 1,1,1,3,3-pentafluoropropane (HFC-245fa) is a nonflammable compound having a boiling point of 15° C. and is a hydrogen-containing fluorohydrocarbon, the compound is considered to entail no or little ozone-depleting or global warming risks. Moreover, HFC-245fa has a boiling point close to that of trichlorofluoromethane (CFC-11) conventionally used as a blowing agent for urethane foams and it is nonflammable. Therefore, HFC-245fa is attracting attention as a promising candidate for blowing agents for urethane which substitute for CFC-11.

However, HFC-245fa exhibits a little high boiling point and a low solubility in polyolefin resins, when used as a volatile blowing agent for the production of foams of polyolefin resins such as styrene resins. Consequently a desirable foam can not be obtained because a gas is released in the die during the extrusion foaming under conventional conditions owing to the low solubility of HFC 245fa.

In this situation, there is a demand for the development of techniques for controlling the boiling point and solubility of HFC-245fa in order to effectively use CFC-245fa as a substitute for CFC-12, CFC-114 or the like.

BRIEF DESCRIPTION OF THE DRAWING

FIG. 1 schematically shows an example of apparatus for producing styrene resin foams. In the drawing, indicated at 1 and 2 are extruders, at 3 a cooler, at 4 a die and at 5 a passage for feed of a blowing agent.

DISCLOSURE OF THE INVENTION

A principal object of the present invention is to provide a process for preparing an extruded foam of polyolefin resin which can retain its excellent heat insulating property, dimensional stability and the like for a long term, with the use of a blowing agent which is free of ozone-depleting risks, unlikely to adversely affect global warming, nonflammable, suitable in boiling point, and highly compatible with raw materials for foams.

The present inventors conducted extensive research in view of the foregoing prior art problems. The inventors attempted to use low-boiling aliphatic hydrocarbons such as propane, butane or the like in the process for extrusion foaming of polyolefin resin in which a volatile blowing agent is used. When propane is used in the process, the obtained foam was not imparted a sufficient heat insulating property, whereas the use of butane resulted in failure to obtain small and stable air bubbles and in pronounced degradation of heat insulating property with time. Namely the attempt failed to produce the contemplated foams. Inventors' further investigations revealed that the above-mentioned object can be achieved by using, as a volatile blowing agent, a mixture of a low-boiling aliphatic hydrocarbon having a boiling point of 15° C. or lower with 1,1,1,3,3-pentafluoropropane (HFC-245fa). The present invention was completed based on this novel finding.

According to the present invention, there is provided a process for preparing a polyolefin resin foam, comprising the step of extruding to a low-pressure zone a melt of polyolefin resin containing a volatile blowing agent uniformly dispersed therein, the process being characterized in that the volatile blowing agent is a mixture of 5 to 95% by weight of 1,1,1,3,3-pentafluoropropane and 95 to 5% by weight of a low-boiling aliphatic hydrocarbon having a boiling point of 15° C. or lower.

It is essential in this invention to use, as a volatile blowing agent in the extrusion foaming, a mixture of 5 to 95% by weight of 1,1,1,3,3-pentafluoropropane (HFC-245fa) and 95 to 5% by weight of a low-boiling aliphatic hydrocarbon having a boiling point of 15° C. or lower.

Specific examples of the low-boiling aliphatic hydrocarbon having a boiling point of 15° C. or lower are methane (b.p.—160° C.), ethane (b.p.—88° C.), ethylene (b.p.—104° C.), propane (b.p.—42° C.), propylene (b.p.—48° C.), butane (b.p.—0.5° C.), butene (b.p.—6° C.), isobutane (b.p.—12° C.), isobutene (b.p.—7° C.), etc. These hydrocarbons can be used either alone or in combination.

These low-boiling aliphatic hydrocarbons have a higher solubility in styrene resins or like polyolefin resins than HFC-245fa, and can be used in a sufficient amount to attain a desired expansion ratio of the foam. Thus, the extruded foams with superior appearance and excellent properties can be easily prepared. These hydrocarbons used alone show a high gas permeability with respect to polyolefin resins and are likely to diminish the dimensional stability and heat insulating property, whereas they show, when used in mixture with HFC-245fa, a depressed gas permeability, leading to production of foams which can retain the high dimensional stability and heat insulating property for a long term. Further, in such a mixture, nonflammable HFC-245fa inhibits the combustion of hydrocarbon which is a flammable component. Consequently this feature provides a widely extended composition range of the mixture as a nonflammable blowing agent.

The mixing ratio of HFC-245fa and low-boiling aliphatic hydrocarbon can be optionally selected according to the intended application, resin formulation and the like from the ranges of 5–95% by weight of the former and 95–5% by weight of the latter.

The mixed blowing agent containing HFC-245fa and low-boiling aliphatic hydrocarbon can be used either alone or in combination with other blowing agent. Examples of other blowing agents combinedly usable are low-boiling halogenated hydrocarbons such as ethyl chloride, difluoromethane, pentafluoroethane, 1,1,1,2-tetrafluoroethane, 1,1,1-trifluoroethane and 1,1-difluoroethane, air, inert gases such as nitrogen and carbon dioxide, water, etc.

When other blowing agent is used, the amount of the mixed blowing agent mentioned above is preferably at least 20% by weight, more preferably at least 40% by weight, based on the total amount of the blowing agents.

The blowing agent for use in this invention may contain a decomposition inhibitor.

Preferred decomposition inhibitors include, for example, nitrobenzene, nitromethane and like nitro compounds, 1,2-butylene oxide, epichlorohydrin and like epoxy compounds, p-t-butyl-catechol, 2,6-di-t-butyl-p-cresol and like phenolic compounds, etc.

The amount of the decomposition inhibitor used is about 0.05 to about 5 parts by weight per 100 parts by weight of the mixed blowing agent containing HFC-245fa and low-boiling aliphatic hydrocarbon.

Either an aromatic polyolefin resin or an aliphatic polyolefin resin can be used as the polyolefin resin in the process of the invention.

Among them, useful aromatic polyolefin resins include, for example, styrene resins. Usable styrene resins include polystyrene, copolymers prepared by copolymerizing styrene and any of α-methylstyrene, maleic anhydride, acrylic acid, acrylic ester, methacrylic acid, methacrylic ester, and the like, polymers prepared by suitably adding styrene-butadiene rubber (SBR) to polystyrene for modification, etc. Useful aliphatic polyolefin resins are, for example, polyethylene, polypropylene, etc.

The expansion ratio of the foam prepared by the process of the present invention is preferably in a suitable range to be described later from the viewpoints of retention of heat insulating property, dimensional stability, and the like. Thus the amount of the blowing agent used is suitably adjusted to achieve the contemplated density of the foam. Usually the total amount of the mixed blowing agent containing HFC-245fa and low-boiling aliphatic hydrocarbon and optional other blowing agent is about 3 to about 30 parts by weight per 100 parts by weight of he polyolefin resin.

According to the invention, it is possible, when required, to add nucleating agents such as talc for control of bubble diameter, coloring agents such as dyes, pigments and the like, lubricants, flame retardants, nonionic surface active agents, etc. in the ranges which do not adversely affect the objects of the invention.

According to the process of the invention, a melt of polyolefin resin containing the volatile blowing agent uniformly dispersed therein is extruded to a low-pressure zone by the conventional extrusion foaming method, whereby a polyolef in resin foam is obtained. For example, raw materials comprising a polyolefin resin and optionally the required amounts of a nucleating agent, a lubricant, a flame retardant and the like are fed into an extruder, followed by injection of the specified amount of a blowing agent. Then the mixture is melted and kneaded with heating. The melt is extruded, via a slit die or like foaming device, to a low-pressure zone, giving the desired polyolefin resin foam. It is desirable that the obtained foam have a foam density of about 0.02 to about 0.045 g/cm$^3$ and an average bubble diameter of about 0.1 to about 0.7 mm. The foregoing process gives a plate-like expanded product of polyolefin resin having a thickness of e.g. about 10 to about 150 mm which is excellent in appearance and properties with a foam density and an average bubble diameter in the above ranges.

When the foam density is less than 0.02 g/cm$^3$, the heat insulating property is appreciably degraded and the expanded product tends to shrink on extrusion, whereas the foam density in excess of 0.045 g/cm$^3$ denotes an increased weight and higher costs. Hence it is undesirable. When the average bubble diameter is less than 0.1 mm, the foam density is difficult to reduce, and the thickness can not be increased, whereas in excess of 0.7 mm, a low density is attained, but a lower heat insulating property results. Hence it is undesirable.

The process for preparing a polyolefin resin foam according to the present invention employs a volatile blowing agent which is free of ozone-depleting risks, unlikely to adversely affect global warming, nonflammable and highly compatible with raw materials for foams, and the obtained expanded product of polyolefin resin is excellent in heat insulating property, dimensional stability and the like and can retain the properties for a long term. The foam prepared by the process of the invention can be suitably used for applications, e.g. as heat insulating materials for building.

BEST MODE FOR CARRYING OUT THE INVENTION

The process for preparing an extruded foam of pololefin resin according to the invention is described below in more detail with reference to the following Examples to which alone the invention is not limited. Examples 1 and 2 and Comparative Examples 1–3

A foam of styrene resin was prepared by the following process using the apparatus shown in FIG. 1 and comprising an extruder 1, an extruder 2, a cooler 3 and a die 4 aligned in this order.

First, 100 parts by weight of styrene resin and 0.5 part by weight of talc (6 μm in average particle size) were kneaded in the extruder 1 to give a melt. Then the blowing agent in the amount shown in Table 1 was injected into the melt from a passage 5 for feed of the blowing agent. The mixture was fed to the die 4 via the extruder 2 and the cooler 3 and forced out to the atmospheric environment from a slit of the die having a opening width of 1.8 mm to mold a 50 mm-thick plate of polystyrene foam. The pressure and temperature in the outlets of extruders and cooler were controlled to the conditions shown in Table 1.

The obtained foams were evaluated in respect of appearance, density, average bubble diameter and heat conductivity. The results are shown in Table 1.

TABLE 1

|  | Example 1 | Example 2 | Comparative Example 1 | Comparative Example 2 | Comparative Example 3 |
|---|---|---|---|---|---|
| Pressure/Temperature Outlet of Extruder 1 | | | | | |
| Pressure (kgf/cm) | 110 | 110 | 110 | 110 | 110 |
| Temperature (° C.) | 180 | 180 | 180 | 180 | 180 |
| Outlet of Extruder 2 | | | | | |
| Pressure (kgf/cm) | 100 | 100 | 100 | 100 | 100 |
| Temperature (° C.) | 150 | 150 | 150 | 150 | 150 |
| Outlet of Cooler 3 | | | | | |
| Pressure (kgf/cm) | 60 | 60 | 60 | 60 | 60 |
| Temperature (° C.) | 110 | 110 | 110 | 110 | 110 |
| Amount of Blowing Agent (wt. part) | | | | | |
| HFC 245fa | 4.8 | 12.1 | 24 | | |
| Propane | 6.3 | | | 7.9 | |
| Isobutane | | 5.2 | | | 10.4 |
| Expanded product | | | | | |
| Appearance | Excellent | Excellent | Poor | Fair | Fair |
| Density (g/cm³) | 0.035 | 0.035 | — | 0.025 | 0.030 |
| Av.Bubble Diameter(mm) | 0.4 | 0.4 | — | 0.7 | 0.5 |
| Heat Conductivity (kcal/mHr° C.) | | | | | |
| after 7 days | 0.0220 | 0.0215 | | 0.0260 | 0.0225 |
| after 100 days | 0.0235 | 0.0220 | | 0.0285 | 0.0250 |
| Remarks | | | Nonfoamable for separation | | |

As apparent from the results, the process of the present invention gives an extruded foam of styrene resin having a good surface appearance and capable of retaining the excellent heat insulating property for a prolonged period of time.

What is claimed is:

1. A process for preparing a polyolefin resin foam, comprising the step of extruding to a low-pressure zone a melt of polyolefin resin containing a volatile blowing agent uniformly dispersed therein, the process being characterized in that the volatile blowing agent is a mixture of 5 to 95% by weight of 1,1,1,3,3-pentafluoropropane and 95 to 5% by weight of a low-boiling aliphatic hydrocarbon having a boiling point of 15° C. or lower.

2. The process according to claim 1, wherein the low-boiling aliphatic hydrocarbon is at least one member selected from the group consisting of methane, ethane, ethylene, propane, propylene, butane, butene, isobutane, and isobutene.

3. The process according to claim 1, wherein the polyolefin resin is polystyrene, polyethylene or polypropylene.

* * * * *